United States Patent [19]

Dunchock

[11] Patent Number: 5,601,268
[45] Date of Patent: Feb. 11, 1997

[54] DRINK HOLDER SUPPORT STRUCTURES INTERFITTING WITHIN EXISTING SPACE

[76] Inventor: Richard Dunchock, 535 S. Coast Hwy., Unit 59, Laguna Beach, Calif. 92651

[21] Appl. No.: 484,498

[22] Filed: Jun. 7, 1995

[51] Int. Cl.⁶ ................................................. A47K 1/08
[52] U.S. Cl. ...................................... 248/311.2; 224/926
[58] Field of Search ............................... 248/311.2, 314, 248/315; 297/118.14; 224/926, 282

[56] References Cited

U.S. PATENT DOCUMENTS

| | | | |
|---|---|---|---|
| 4,846,382 | 7/1989 | Foultner et al. | 224/926 X |
| 4,984,722 | 1/1991 | Moore | 248/311.2 X |
| 5,072,909 | 12/1991 | Huang | 248/311.2 |
| 5,135,195 | 8/1992 | Dane | 248/311.2 |
| 5,174,534 | 12/1992 | Mitchell | 248/311.2 |
| 5,180,088 | 1/1993 | De Angeli | 248/311.2 X |
| 5,219,140 | 6/1993 | Spykeman | 248/311.2 |
| 5,465,891 | 11/1995 | Bridges | 224/566 |

Primary Examiner—Ramon O. Ramirez
Attorney, Agent, or Firm—Hawes, Fischer & Dickinson

[57] ABSTRACT

The supports for the stowable drink holder of the present invention include generally a plug design which may be used in conjunction with a shoe design to garner support from existing spaces within a vehicle. The stowable drink holder will typically have a cover or tray portion, opposing drink support arms, and a carriage from which the drink support arms and tray/cover foldably depend. In configurations where the carriage is mounted to a vertical surface, the tray covers the folded arms and carriage, and is thus sometimes referred to as a cover. The drink holder will be supported from the tray portion, and thus the carriage will pivotally depend from the tray, and the opposing drink support arms will depend from the carriage. The drink holder will depend from the plug structure, the plug structure will occupy the space of an open hole in the console or arm rest. When the plug is inserted, as it supports the drink holder, it will provide a flat surface to the tray portion of the drink holder.

6 Claims, 6 Drawing Sheets

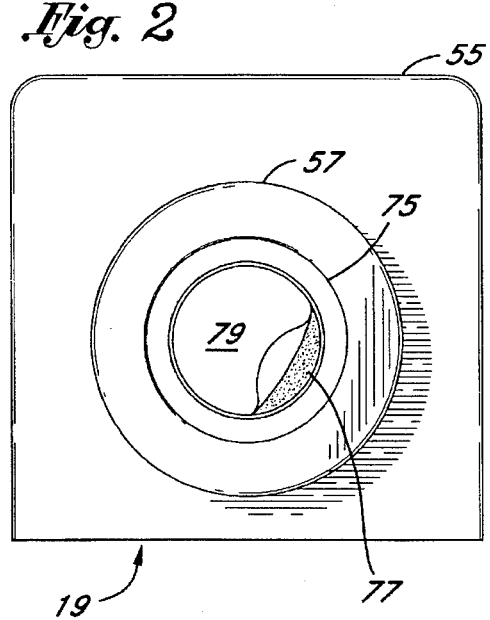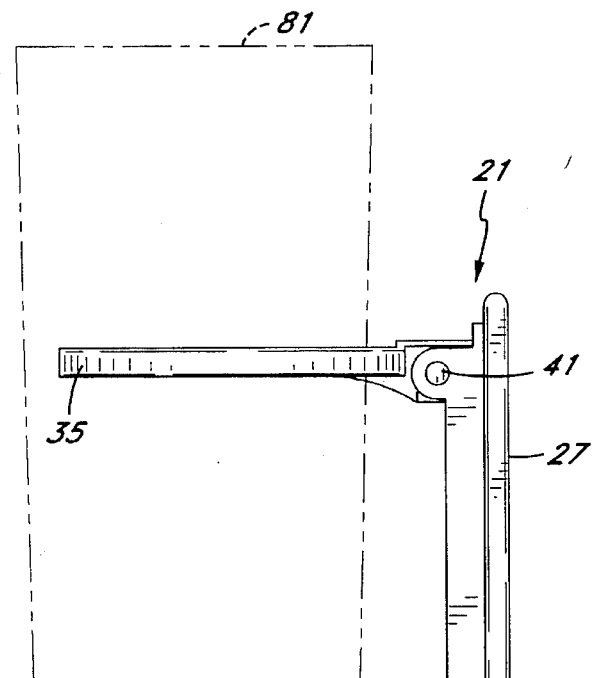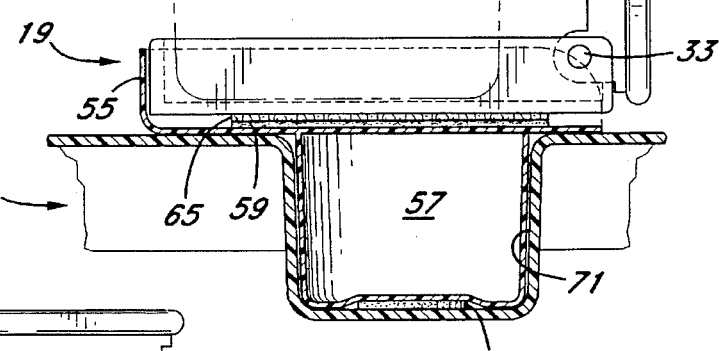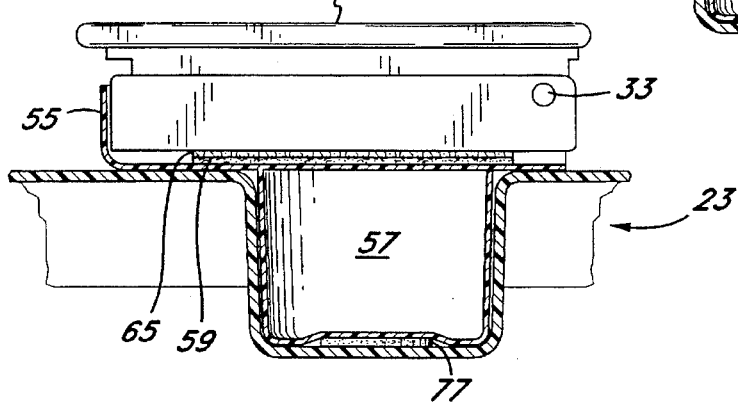

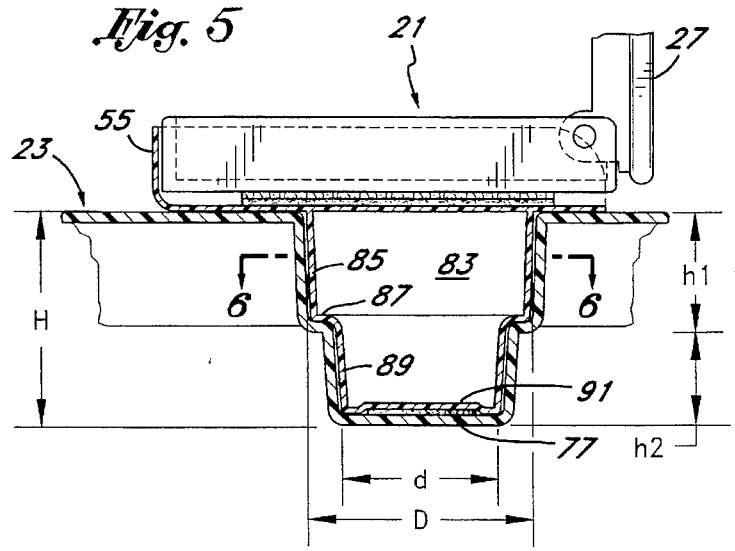
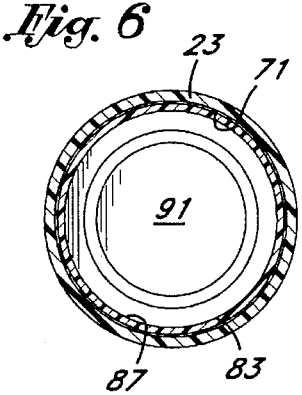
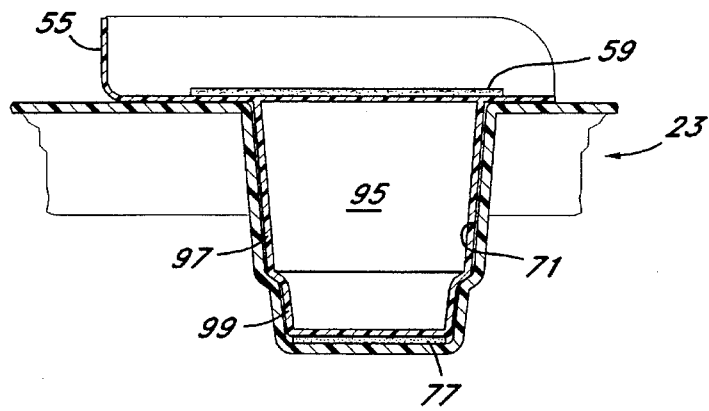
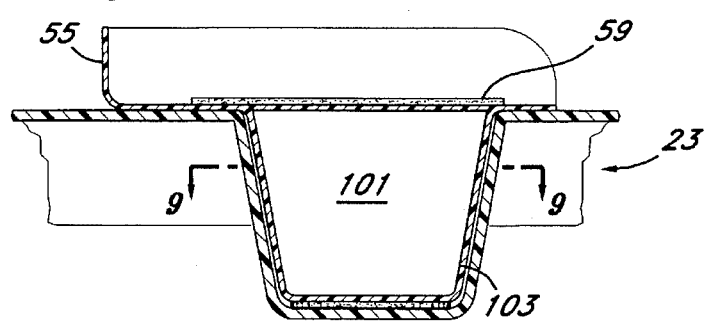
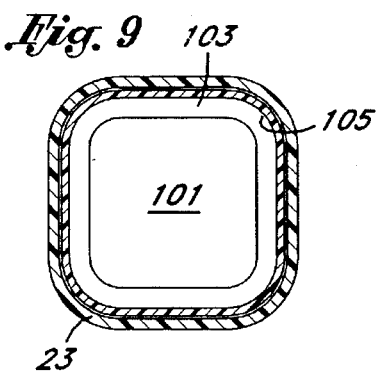

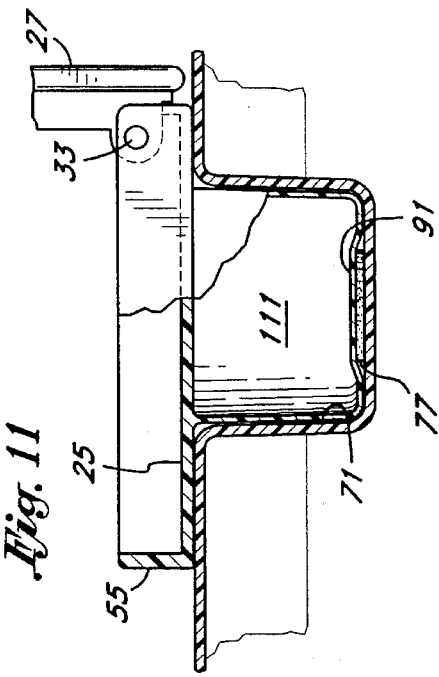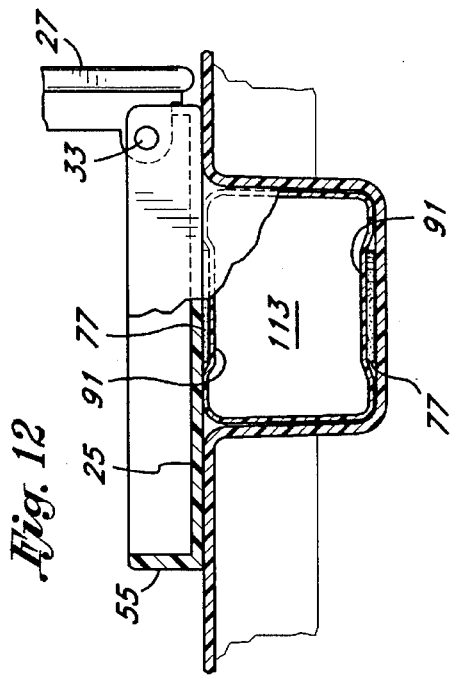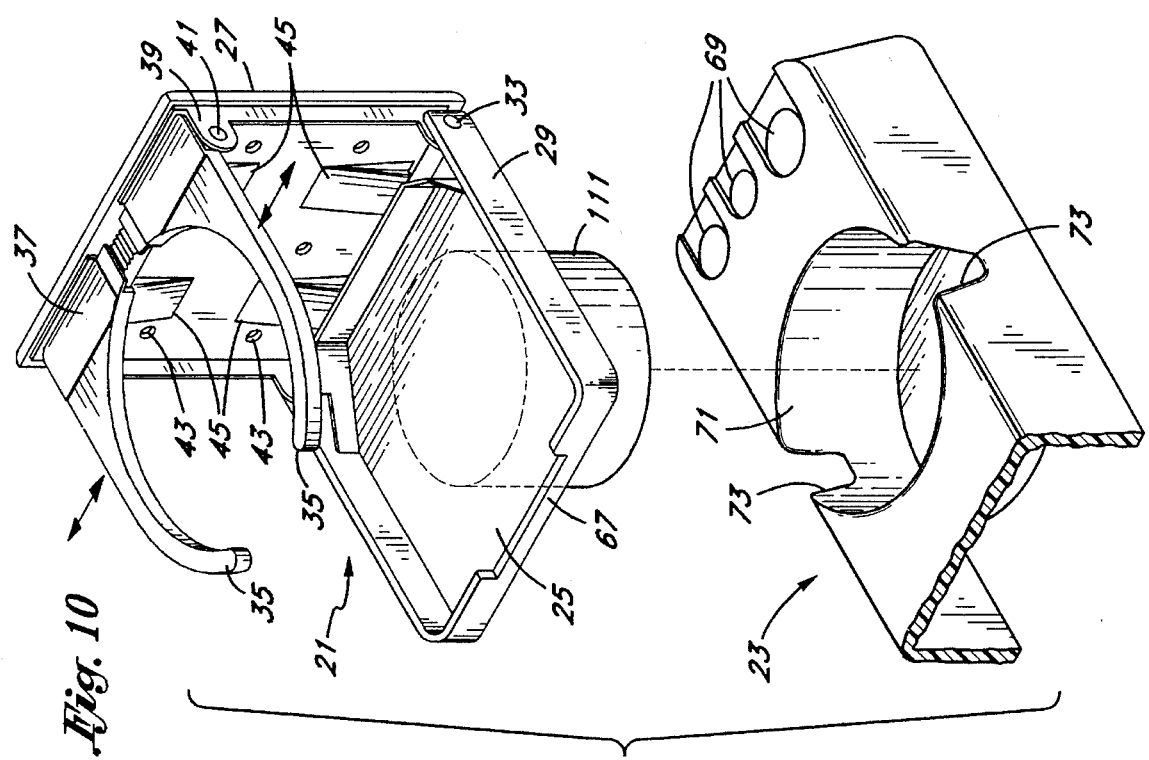

DRINK HOLDER SUPPORT STRUCTURES INTERFITTING WITHIN EXISTING SPACE

FIELD OF THE INVENTION

The present invention relates to the field of efficient support structures used to provide a stable structure for drink holder used for efficiently supporting a cylindrical drink container, and more specifically to plug and shoe types structures which enable the drink holder to take advantage of a greater variety of sizes, shapes, and types of support structures which are present within a variety of motor vehicles.

BACKGROUND OF THE INVENTION

Structures for supporting drink containers have been widely in use for some time, and are made with a wide variety of characteristics in mind. For example, U.S. patent application Ser. No. 08/385,333 illustrates an Integrated Stowable Drink Holder for a Vehicle in which a device having opposing drink support arms were attached to a vertically oriented carriage, which also supported a cover which was used to provide a horizontal planar support for a drink cup.

The device including the opposing drink support arms, carriage, and cover work well together and have positive closure. The drink holder can be used by a specialized attachment to a structure, such as by inserting screws, bolts or rivets. Alternatively, adhesive or glue can be used to attach such a structure to the inside of a vehicle. However, although such attachment would yield a high utility drink holder having an aesthetic quality suitable for luxury automobiles, such attachment when done in the presence of existing drink support structures may result in wasted space.

Further, the presence of a high quality drink holder along with existing drink support structures may seem aesthetically undesirable. Further, users and especially guest users would tend to use the non-adjustable low quality holders first because they are the most visible. When the high quality, adjustable, foldable holders are in use, the lower quality holders equipped with the vehicle seem even more aesthetically unpleasing.

What is therefore needed is a structure which can utilize, and especially occupy the existing drink holder structures to provide support for the foldably stowable, adjustable high quality holders. The ability to accomplish this goal achieves a number of objectives. First, it makes the higher quality holder the only available holder for use in the vehicle, which reduces incidences of spillage due to its ability to better accommodate drink containers. Secondly, it eliminates the necessity to alter other surfaces, such as by the use of screws, rivets, glue and the like for installation of the drink holder. Thirdly, it eliminates the duplication of drink holder devices, insuring that the only drink holder used will be the best drink holder and which will minimize the incidence of spillage. In eliminating the duplication of drink holder devices, aesthetic utility is achieved by reducing the overall number of drink holders. Fourthly, from a space efficiency standpoint, the utilization of the existing drink holder space to support a higher quality drink holder conserves space in the vehicle and prevents waste of the existing drink holder space.

Other drink holder support devices are known, but none which seem to take full advantage of the existing drink holder space. U.S. Pat. No. 4,887,784 issued to Kayali on Dec. 19, 1989 and entitled "Adjustable Drink Holder" discloses an articulating clamping device which must depend from a thin structure to obtain support. U.S. Pat. No. 5,390,887 issued to Campbell on Feb. 21, 1995 and entitled "Adjustable Beverage Container Holder for use in Vehicles" discloses a fish-hook grasping platform and a set of spring bands.

U.S. Pat. No. 5,316,255 issued to Marcusen on May 31, 1994 and entitled "Vacuum Container Holder" discloses an elaborate vacuum table to pull down on a beverage container. U.S. Pat. No. 5,249,770 issued to Louthan on Oct. 5, 1995 and entitled "Beverage Container Holder" discloses a hanging beverage holder. U.S. Pat. No. 5,042,649 issued to Hunnicutt on Oct. 1, 1991 and entitled "Drink Holder Adapter" discloses an elaborate combination of a cage having upper and lower cage sections, an upper insulator to fit within the upper cage, the drink container to fit in the upper insulator, the lower portion of the cage to fit within a drink space in an arm rest. U.S. Pat. No. 5,326,064 issued to Sapien on Jul. 5, 1994 and entitled "Holder for Preventing Spills" discloses a device which encourages spills to run through an annular gap in the holder to collect in a bottom reservoir.

U.S. Pat. No. 5,135,195 issued to Dane on Aug. 4, 1992 and entitled "Beverage Receptacle Holder" discloses an enlarged upper round section and a smaller lower round section having extending lengths of material for grasping. This holder is not collapsible and occupies a significant amount of space. U.S. Pat. No. 5,088,673 issued to Chandler on Feb. 18, 1992 and entitled "Cup Adapter for use in Cylindrical Sockets" discloses an adapter device similar to that of Dane, above, but the construction is smooth cylindrical with a slot to accommodate a handle. U.S. Pat. No. 5,174,534 issued to Robert L. Mitchell on Dec. 29, 1992 and entitled "Container Adapter" discloses a two diameter sized cylindrical sleeve and annular adapter portion, which provides an upward extension of a lower annular space. U.S. Pat. No. 5,330,145 issued to Evans et al on Jul. 19, 1994 and entitled "Holder for Drinking Vessels" discloses a mug adapter. U.S. Pat. No. 5,033,709 issued to Yuen et al on Jul. 23, 1991 and entitled "Holding Device" discloses a complex mechanical device with dual translation spring loaded urged members.

None of the above devices provide an adjustable drink holder to depend from an existing drink space which also provides for foldable deployment and stowage. All of the above devices are not structures which would synergize with the interior of a luxury automobile, from a standpoint of either space savings, aesthetics, or cup support utility. What is therefore needed are designs which permit the existing structures within an automobile to be taken advantage of in a useful, aesthetically pleasing and attractive manner, and which can be somewhat customized to the particular type of drink support or other utility support space within a vehicle.

SUMMARY OF THE INVENTION

The supports for the stowable drink holder of the present invention include generally a plug design which may be used in conjunction with a shoe design to garner support from existing spaces within a vehicle. The stowable drink holder will typically have a cover or tray portion, opposing drink support arms, and a carriage from which the drink support arms and tray/cover foldably depend. In configurations where the carriage is mounted to a vertical surface, the tray covers the folded arms and carriage, and is thus sometimes referred to as a cover.

In the configurations of the present invention, the drink holder will be supported from the tray portion, and thus the carriage will pivotally depend from the tray, and the opposing drink support arms will depend from the carriage. The drink holder will depend from the plug structure, the plug structure will occupy the space of an open hole in the console or arm rest. When the plug is inserted, as it supports the drink holder, it will provide a flat surface to the tray portion of the drink holder.

The tray portion of the drink holder can be attached to the plug in any number of ways, such as bolting, gluing, providing mating structure, threaded coupling, and the like. Since the plug structure occupies significant space, the plug structure can easily contain and accommodate any fixturing which will depend from the tray, including the tail of a bolt or other extended structure.

Further, the inventive method of supporting the drink holder disclosed herein contains the additional advantage in that it enables the avoidance of permanent fixturing of the holders to the interior of the vehicle. When the interior spaces are needed for other purposes, the drink holders can be removed. When the vehicle is sold, the drink holders can be removed for use in the next vehicle.

BRIEF DESCRIPTION OF THE DRAWINGS

The invention, its configuration, construction, and operation will be best further described in the following detailed description, taken in conjunction with the accompanying drawings in which:

FIG. 2 is the bottom view of the tray and plug as shown in FIG. 1;

FIG. 3 is a side view of the assembled drink holder of FIGS. 1 and 2 in deployed position and illustrating a drink container in phantom;

FIG. 4 is a side view of the assembled drink holder of FIGS. 1–3 in stowed position and illustrating a drink container in phantom;

FIG. 5 is a side sectional view of a second embodiment of the support for a drink holder of the present invention illustrating a stepped cylindrical member;

FIG. 6 is a bottom view of the second embodiment taken along line 6—6 of FIG. 5;

FIG. 7 is a side view of a third embodiment of the drink holder support of the present invention;

FIG. 8 is a side view of a fourth embodiment of the drink holder support having a frusto-pyramidal shape;

FIG. 9 is a bottom view of the drink holder support of FIG. 8 and taken along line 9—9 of FIG. 8;

FIG. 10 is a perspective view of an embodiment of a combination drink holder and support connected directly to the drink holder tray;

FIG. 11 is a perspective view of an embodiment of a combination drink holder and support shown formed integrally with the drink holder tray and shown within a console;

FIG. 12 is a perspective view of an embodiment of a combination drink holder and separate support shown within a console;

DETAILED DESCRIPTION OF THE PREFERRED EMBODIMENT

Figure 1:
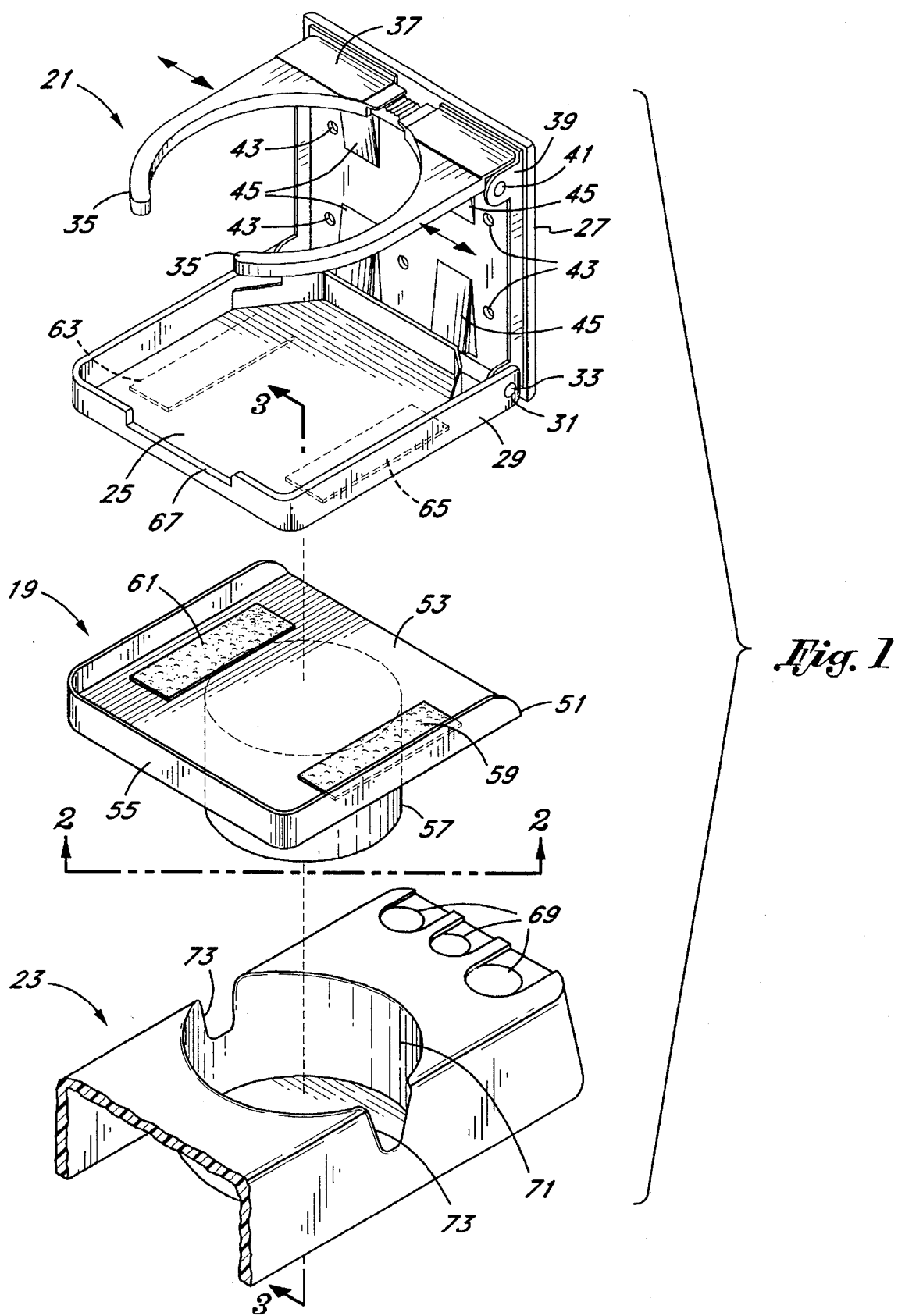
FIG. 1 is an exploded view illustrating a drink holder, a combination plug (cylindrical member) and shoe for supporting the drink holder, and an example of a console into which the plug and shoe interfits.

The description and operation of the invention will be best described with reference to FIG. 1. FIG. 1 shows an exploded view of one embodiment of the support structure 19 of the present invention lying between a drink holder 21 and a console portion 23.

The drink holder 21 is advantageous for use within a vehicle. The drink holder has a lower horizontal tray 25. A back vertical portion 27 is pivotally attached to the tray portion 25. This is facilitated by the presence of an abbreviated height vertical wall 29 having an aperture 31 into which a pivot pin 33 extends from the back vertical portion 27.

Similarly, a pair of pivot arms 35 have an adjustable opposing spacing and depend from a hinge 37 which is pivotally connected to the vertical portion 27. The vertical portion 27 carries a pair of upper ears 39, one of which is shown, and which engage pivot pins 41 extending from the hinge 37.

Since the basic drink holder 21 is versatile, several other structures can be seen on the vertical portion 27. There are a series of apertures 43 which can be used to attach a decorative member to the rear side of the vertical portion 27. The decorative portions may be interchangeable and can be attached to the vertical portion 27 by bolting or by using snapping members to facilitate ready makeup of a given drink holder 21 to a rear decorative member. When the drink holder 21 is used not in conjunction with a plug member or other support, the same apertures 43 will usually be used to anchor the vertical portion to a vertical wall.

In addition, spring portions 45 which appear as ramp projections from the vertical portion 27 are shown. These spring portions 45 may be strengthened by metal inserts where necessary to give a more positive closing force.

Beneath the holder 21, the support structure 19 has an upper planar shoe portion 51 including a horizontal planar surface 53 and an abbreviated height vertical wall 55 which surrounds the horizontal planar surface 53 on three sides. The height of the vertical walls 55 will match the height of the vertical wall 29 of the holder 21, with some additional height to allow the tray 25 of the holder 21 to fit onto the planar surface 53 of the support structure 19 to allow the upper edges of the walls 55 and 29 to come to approximately the same height. Further, where materials are placed between the tray 25 of the holder 21 and the planar surface 53 which increase the vertical stacking distance between them, it may be expected that the height of the vertical wall 55 may be increased, to be even with the wall 29, but never enough to impede the closure of the vertical portion 27 onto the tray 29.

The shoe portion 51 has a vertical wall 55 only about three quarters of the periphery of the planar surface 53 in order to enable the vertical portion 27 to have clearance about the tray portion 25, not touching or binding with any portion of the shoe 51. The absence of vertical wall 55 at the rear of the shoe 51 will also enable the holder 21 to be more readily grasped should occasion ever arise to remove the holder 21 from the shoe 51.

The shoe 51 is attached to a cylindrical member 57 in a permanent fashion. The attachment may be by welding, glue, bolting, and the like. Alternatively, the cylindrical member 57 and the shoe 51 may be integrally formed as a unitary piece of manufacture. The cylindrical member 57 can have a shape which deviates from that of a vertically walled cylinder, but the use of the term cylindrical member and the illustration of such a vertically walled member is made for illustrative purposes and to facilitate an understanding of the invention, particularly with respect to FIG. 1.

Referring again to the shoe 51, a pair of strip shaped fastening members 59 and 61 can be seen. These hook and loop fasteners are commonly and popularly known under the generic name Velcro, and are available as pre adhesive backed portions. The members 59 and 61 can be either hook or loop members. A mating pair of fastening members 63 and 65 and shown in phantom at the bottom side of the tray 25 of the holder 21 and which are shown in a position to mate with the members 59 and 61 once the holder 21 tray 25 is brought down onto the horizontal planar surface 53. The fastening members 63 and 65 can be either hook or loop members, but their nature will be chosen to interlock with the members 59 and 61 which are attached to the horizontal planar surface 53.

Note also by the similarity between the shoe 51 and the tray 25 that the shoe 51 can be sized slightly less, and made to act as the tray 25. The only addition necessary would be an aperture 31 into the vertical wall 55 near the non-walled side. Note that the tray 25 includes a slot 67 to facilitate the manual grasping of the tray 25 or vertical portion 27 to unfold the vertical portion from the tray 25, but such is not as readily needed when it is the vertical portion 27 which is to be grasped and brought to the vertical position. If needed, the shoe 51 could be formed with a corresponding slot 67.

Referring to the lower portion of FIG. 1, a console portion 23 typically may include coin slots 69 for holding various denominations of change. The console 23, more importantly includes a cylindrical void 71 or other such open space, with which cylindrical member 57 can engage. Again, void 71 need not be completely vertical, but is illustrated as such in order to show compatibility with the cylindrical member 57. For example, the cylindrical void 71 can be frusto-conical. The material of the console portion 23 may be pliable so as to deform upon the insertion of the cylindrical member 71 which will enable the cylindrical member to have a positive volume greater than the negative volume of the void 71. Note that the void 71 also has a pair of side slots 73, as may be required to accommodate a mug handle or other structure, or simply provided for stress relief where the console portion 23 is made of resilient material.

In the configuration of FIG. 1, an existing drink holder 21 can be utilized with a support structure 19 for use with a console portion 23 with the addition of a mating pair of fastening members 63 and 65 to engage with fastening members 59 and 61.

Referring to FIG. 2, a bottom view of the support structure 19 is illustrated. The cylindrical member 57 is shown as having a recessed portion 75 carrying a layer of adhesive material 77, protectively accompanied by a peel-off portion 79.

Referring to FIG. 3, a side cut away view of all of the structures of FIG. 1 are shown in an assembled position. The adhesive layer 77 assists in holding the support structure 19 in place within the cylindrical void 71. This can be especially useful where the void 71 is significantly bigger than the diameter of the cylindrical member 71. In the example of FIGS. 1–3, the depth of the cylindrical member 71 was sufficient to allow adhesive material to be effectively used from the bottom of the cylindrical member 57. In instances where the cylindrical void 71 is much deeper, but not wider than the cylindrical member 57, adhesive layers 77 can be placed between the vertical extent of the wall of the cylindrical member 57 and the vertical extent of the walls of the cylindrical void 71.

Also shown in phantom is a drink container 81, shown in phantom, in place within the drink holder 21 supported by the support structure 19. The drink holder 21 is shown in open position with the pair of pivot arms 35 engaging the drink container 81.

FIG. 4 illustrates a side view of the structures shown in FIG. 3, but in closed, stowed position. The drink holder 21 and the support structure 19 are shown as fitting neatly and compactly over the console portion 23, over the cylindrical void 71.

However, not all console portions 23 have completely cylindrical voids, and variations may occur within the scope of the invention. Referring to FIG. 5, the cylindrical member 57 of FIGS. 1–4 has been changed to be a stepped cylindrical member 83 having an upper frusto-conical portion 85 which has a radial step 87 blending into a lower, lesser diameter frusto-conical portion 89.

The dimensions of the two section cylindrical member 83 can vary widely. The axial length of the upper cylindrical portion 83 as it terminates at its smallest diameter is shown as h1 while the lower cylindrical portion 89 has an axial length terminating at its smallest diameter which is shown as h2. The dimensions h1 and h2 are shown as equalling the overall depth of the cylindrical portion 83 and as having height H. The diameters of the frusto-conical portions 85 and 89 have diameters at their smallest portions of D and d respectively. In addition, the bottom of the two section cylindrical member 83 has an indentation 91 to accommodate the layer of adhesive material 77.

Referring to FIG. 7, a variation on the cylindrical member 83 is shown as a cylindrical member 95. The cylindrical member 95 is also a two section frusto-conical structure, but an upper frusto-conical section 97 has a more gradual and sloped transition into a lower frusto-conical section 99. In addition, there is no indentation needed to accommodate the layer of adhesive material 77 since the axial height of the section 99 is slightly less than the axial height of the cylindrical void 71.

Referring to FIG. 8, a frusto-pyramidal member 101 is shown in place of the cylindrical member 57. The member 101 is a four sided gently sloping pyramid section with rounded corners. The side sectional view of FIG. 8 becomes more understandable when view with respect to FIG. 9, a sectional view taken along line 9—9 of FIG. 8. The member 101 has sloping walls 103, and rounded corners 105.

Referring to FIG. 10, an alternative embodiment is shown where a cylindrical member 111 is connected directly to the bottom of the lower horizontal tray 25 of the drink holder 21. Cylindrical member 111 is slightly frusto-conical shaped as can be seen in FIG. 11. In this configuration, the cylindrical member 111 may be glued, riveted, bolted or otherwise connected to the tray 25. However, it is preferable for the tray 23 and the cylindrical member 111 to be formed integrally, as is shown in FIG. 11. As can be seen, the material forming the tray 23 and the cylindrical member 111 are continuously connected. The upper right portion of the FIG. 11 is broken away to show the externals of the tray 23 and cylindrical member 111 as they cooperate within a cylindrical void 71.

Referring to FIG. 12, a variation on the structural configuration of FIG. 11 illustrates the use of a cylindrical spacer 113 which can be attached to the tray 23 of the drink holder 21 as was shown in FIG. 1. The spacer 113 has indentations 91 at the upper and lower ends thereof to accommodate layers of adhesive material 77 to help hold the spacer 113 and the drink holder 21 in place.

Figure 13:
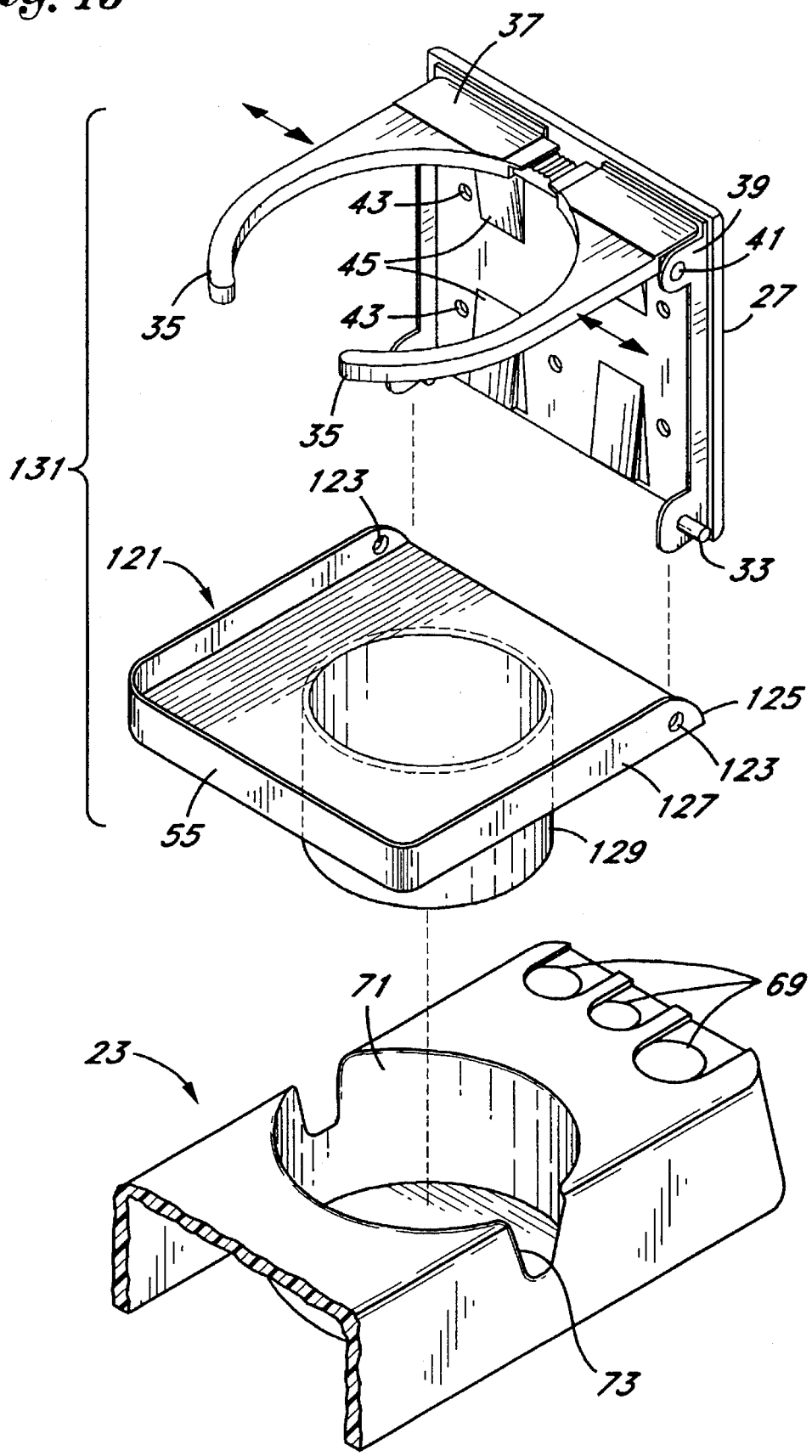
FIG. 13 is a perspective view of an embodiment of a combination drink holder and support including the shoe of FIG. 1 integrated for use as a drink container support.

Referring to FIG. 13, a further embodiment is shown wherein the support structure 19 of FIG. 1 has been modified to form a support structure 121 wherein the shoe portion will act as the tray 25 of FIG. 1. A pair of rear apertures 123 are provided in an upper shoe portion 125, and in the abbreviated height walls 127 to enable the shoe portion 125 to act as the tray 25 of FIG. 1. The apertures 123 are to be engaged by the pivot pins 33 of the back vertical portion 27.

Here, a cylindrical portion 129 is connected to the upper shoe portion 125. The drink holder of FIG. 13 is an integrated shoe drink holder 131 and can generally be made available as a single, ready to insert into a console 23 unit.

Figure 14:
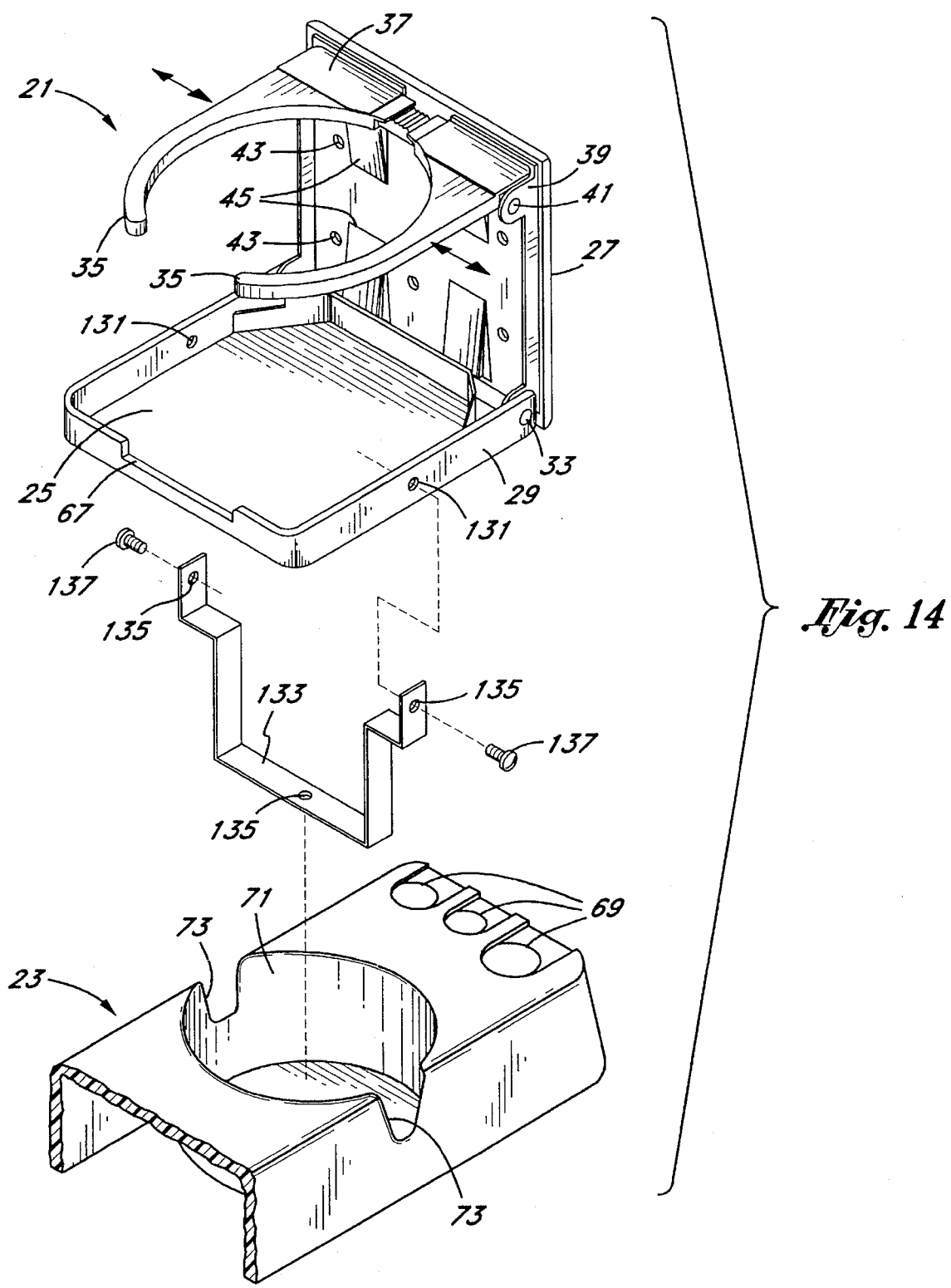
FIG. 14 is a perspective view of an embodiment of a combination drink holder and separate bracket shown in position over a console.

Referring to FIG. 14, the drink holder 21 of FIG. 1 has been modified slightly to enable installation with a bracket. The tray 25, and in particular the vertical walls 29 have been fitted with a pair of apertures 131. The drink holder 21 of FIG. 14 is otherwise identical to the drink holder 21 of FIG. 1 in all other respects. Below the tray 25 is shown a bracket 133 and which has a profile matching the widest dimension of the cylindrical void 71.

The bracket 133 has a further pair of apertures 135 to accommodate screws 137. As can be seen, the bracket 133 fits into the cylindrical void 171. The bracket 133 can be attached into the surfaces of the cylindrical void 171 with glue, adhesive, the use of hook and loop fasteners, or with another screw 137 directed into the bottom of the console portion 23. The screws 137 which will extend into the apertures 137 will not significantly extend into the area of the tray 25 so that a drink container 81 will not have interference or difficulty fitting into tray 25. In the course of installation, the bracket 133 will first be installed into the bottom of the console portion 23, and then the screws 137 will be inserted through the apertures 131 to secure the drink holder 21 into place.

While the present invention has been described in terms of a series of support structures for an integrated stowable drink holder for a vehicle, one skilled in the art will realize that the structure and techniques of the present invention can be applied to many appliances. The present invention may be applied in any situation where good, sturdy support is desired to take advantage of existing support structure.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A support system for supporting a drink container support comprising:

a vertically downwardly extending portion for deriving support from and fitting into an existing space in a vehicle interior and wherein said vertically downwardly extending portion has a flat surface;

a shoe portion overlying and connected to said downwardly extending portion, partially surrounded by an abbreviated height vertical wall and defining a space between lengths of said abbreviated height vertical wall to accommodate a portion of a self contained drink container support; and a layer of adhesive material engaging said flat surface.

2. A drink container support system for supporting a drink container utilizing an existing space in a vehicle, and including the support system for supporting a drink container support as recited in claim 1, and further comprising a self contained drink container support secured atop said shoe member.

3. The drink container support system as recited in claim 2 wherein said self contained drink container support further comprises:

a tray supported by said shoe portion and available as a support for a drink container;

a back vertical portion pivotally supported by said tray and pivotally deployable to a vertical position;

an upper drink holder carried by and pivotally deployable from said back vertical portion into a horizontal position and carrying a pair of pivot arms for stabilizing a drink container.

4. A drink container holder and support further comprising:

a bracket for deriving support from and fitting into an existing space in a vehicle interior, and including a pair of apertures in said bracket;

a tray supported by said bracket portion and available as a support for a drink container, said tray defining a pair of apertures alignable with said apertures of said bracket;

a back vertical portion pivotally supported by said tray and pivotally deployable to a vertical position;

an upper drink holder carried by and pivotally deployable from said back vertical portion into a horizontal position and carrying a pair of pivot arms for stabilizing a drink container; and securing means for securing said tray to said bracket through said apertures of said bracket and said tray.

5. A drink container holder and support further comprising:

a bracket for deriving support from and fitting into an existing space in a vehicle interior and defining a first pair of flat surfaces for providing lateral support;

a tray laterally supported by said flat surfaces of said bracket portion and available as a support for a drink container;

a back vertical portion pivotally supported by said tray and pivotally deployable to a vertical position;

an upper drink holder carried by and pivotally deployable from said back vertical portion into a horizontal position and carrying a pair of pivot arms for stabilizing a drink container; and securing means for securing said tray to said bracket.

6. The drink container holder of claim 5 wherein said bracket has a second pair of flat surfaces, said first and said second pair of flat surfaces available as a support for a drink container.

* * * * *